(12) United States Patent
Manea et al.

(10) Patent No.: US 8,321,301 B2
(45) Date of Patent: Nov. 27, 2012

(54) METHOD AND SYSTEM FOR CLOTHING SHOPPING USING AN IMAGE OF A SHOPPER

(75) Inventors: Natalia Manea, San Diego, CA (US);
Ciprian Manea, San Diego, CA (US)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 12/839,695

(22) Filed: Jul. 20, 2010

(65) Prior Publication Data
US 2012/0022978 A1 Jan. 26, 2012

(51) Int. Cl.
*G06Q 30/00* (2012.01)
(52) U.S. Cl. ................. 705/27.1; 345/629
(58) Field of Classification Search ........... 705/26.1, 705/27.1, 27.2; 345/419, 629, 633, 660
See application file for complete search history.

(56) References Cited

U.S. PATENT DOCUMENTS

| | | | | |
|---|---|---|---|---|
| 5,930,769 A * | 7/1999 | Rose | | 705/26.81 |
| 5,956,525 A * | 9/1999 | Minsky | | 396/3 |
| 6,307,568 B1 * | 10/2001 | Rom | | 345/629 |
| 6,473,671 B1 * | 10/2002 | Yan | | 700/134 |
| 6,901,379 B1 | 5/2005 | Balter et al. | | |
| 6,985,875 B1 * | 1/2006 | Wolf | | 705/26.62 |
| 7,242,999 B2 * | 7/2007 | Wang | | 700/132 |
| 7,343,320 B1 * | 3/2008 | Treyz et al. | | 705/26.5 |
| 7,398,133 B2 * | 7/2008 | Wannier et al. | | 700/132 |
| 2002/0004763 A1 * | 1/2002 | Lam | | 705/26 |
| 2002/0010638 A1 * | 1/2002 | Fischer | | 705/26 |
| 2003/0050864 A1 * | 3/2003 | Trajkovic et al. | | 705/27 |
| 2003/0050866 A1 | 3/2003 | Fujioka | | |
| 2003/0063794 A1 | 4/2003 | Rubinstenn et al. | | |
| 2003/0101105 A1 * | 5/2003 | Vock | | 705/27 |
| 2004/0227752 A1 * | 11/2004 | McCartha et al. | | 345/419 |
| 2008/0163344 A1 | 7/2008 | Yang | | |
| 2010/0030578 A1 * | 2/2010 | Siddique et al. | | 705/3 |

OTHER PUBLICATIONS

Virtual Try-On, Virtual and Augmented Reality Status Conference 2004.*

* cited by examiner

*Primary Examiner* — Jeffrey A Smith
*Assistant Examiner* — Matthew Zimmerman
(74) *Attorney, Agent, or Firm* — John L. Rogitz

(57) ABSTRACT

A shopper inputs a 3D image of himself to a computer which normalizes the image to a standard. The shopper can select an article of clothing from a web site and the image of the article is normalized to the shopper's image using the same normalization standard and superimposed onto the shopper's image. The manufacturer's size corresponding to the correct article size may also be displayed.

12 Claims, 1 Drawing Sheet

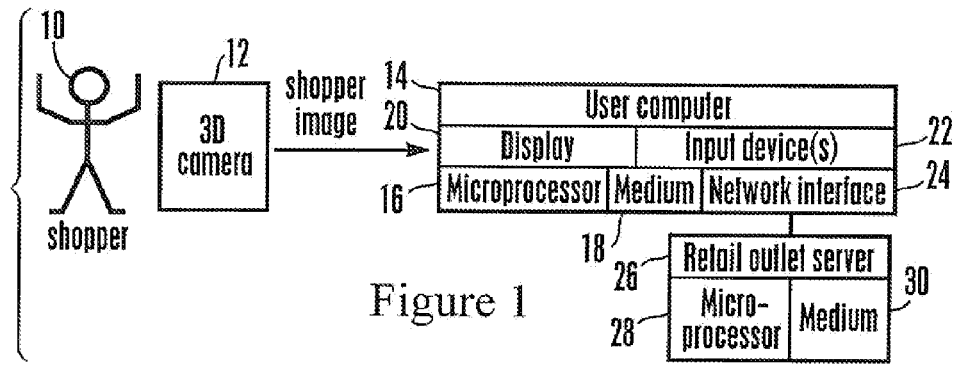
Figure 1
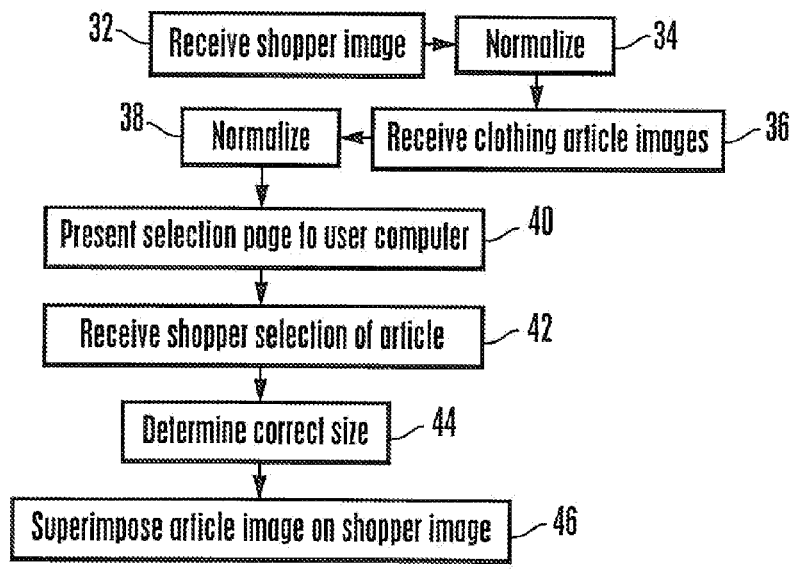
Figure 2
Figure 3
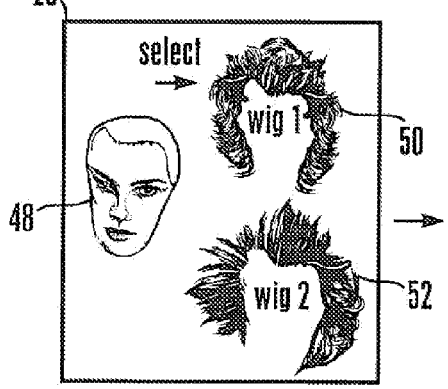
Figure 4
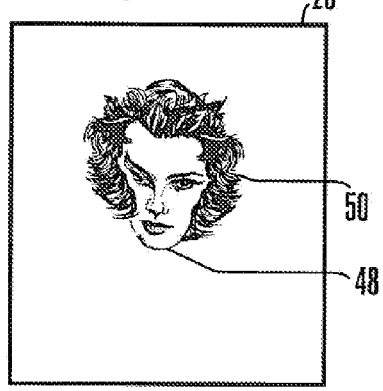

METHOD AND SYSTEM FOR CLOTHING SHOPPING USING AN IMAGE OF A SHOPPER

I. FIELD OF THE INVENTION

The present application relates generally to online clothing shopping using a three dimensional (3D) image of the shopper.

II. BACKGROUND OF THE INVENTION

Internet clothes shopping is widespread. As understood herein, shopping for clothing on the Internet affords advantages but also poses challenges compared to in-store shopping. On the plus side, a person may purchase clothing on the Internet without having to travel to a retail outlet. Also, a person can view the images of a relatively large number of clothing articles on an Internet web page more quickly than she would be able to by physically browsing through articles in a store. Further, using computer technology a shopper may generate a digital image of herself over which an image of a desired clothing article may be superimposed to quickly give the shopper an idea of how that article would appear when worn by the shopper.

As understood herein, however, a principal drawback of Internet shopping is one of sizing. Obviously different shoppers have different physical sizes and furthermore different manufacturers produce clothing of differing physical dimensions even when a particular article is said by a manufacturer to be a certain size. For example, a men's size 9D show from one manufacturer in actuality may be physically narrower than a size 9D from a different manufacturer. Likewise, a woman's size 9 dress from one designer may fit a shopper whereas a size 9 from a different designer may not fit, owing to variations in how manufacturers size their clothing.

As also recognized by present principles and as intimated above, overlaying images of clothing onto images of a shopper advantageously gives the shopper an idea of how a particular article might look on her, but again a problem with sizing arises because the shopper's image does not typically indicate the true size of the shopper. With these considerations in mind, present principles are advanced.

SUMMARY OF THE INVENTION

A computer assembly includes a processor and a network interface communicating with the processor to establish communication between the processor and a wide area network. A computer readable storage medium is accessible to the processor to cause the processor to receive an image of a shopper and normalize the image of the shopper to a standard to render a normalized shopper image. The processor also receives images of clothing articles. Sizes of the clothing articles are normalized to the standard such that when first and second clothing articles from respective first and second article sources have respective first and second designated sizes from their respective article sources but are of the same size when compared to the standard, respective first and second images of the first and second clothing articles have identical sizes as each other when presented on a computer display. The processor receives a selection of one of the articles and responsive to the selection, generates a composite image of the image of the shopper and a user-selected one of the first or second images for presentation on a computer display.

In some embodiments the images are 3D images. If desired, responsive to the selection of one of the articles, the processor determines a correct size of the article based on the normalized shopper image. The processor can normalize an image by comparing the respective size of the respective clothing article to a standard clothing article size. Or, the processor normalizes an image by comparing the image to a visually presented scale. Yet again, the processor can normalize an image by comparing the image to a user-input dimension. The correct size may be presented on a display in terms of a clothing article source-defined size.

In another aspect, a method includes receiving a 3D shopper image and determining a correct clothing article size based on the shopper image. The method also includes superimposing an image of a clothing article having the correct clothing article size on the 3D shopper image.

In another aspect, a computer assembly includes a processor, a display controlled by the processor, and a network interface communicating with the processor to establish communication between the processor and a wide area network. A computer readable storage medium is accessible to the processor and bears logic causing the processor to execute logic that includes receiving a shopper image. The shopper image is normalized to a standard. The logic includes receiving a user selection of an article of clothing. A correct size of the article of clothing is determined based on the shopper image normalized to the standard. The logic further includes presenting on the display an image of the article of clothing superimposed onto the shopper image, and presenting on the display a manufacturer's size corresponding to the correct size of the article of clothing.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an example system in accordance with present principles;

FIG. 2 is a flow chart of example logic in accordance with present principles; and FIGS. 3 and 4 are screen shots illustrating how hair pieces may be presented for sale on a computer screen.

DETAILED DESCRIPTION OF THE PREFERRED EMBODIMENT

Referring initially to FIG. 1, the image of a shopper 10 may be generated by an imaging device such as a 3D camera 12 and provided to a user computer 14, which may be instantiated by any suitable platform such as a personal computer, laptop computer, personal digital assistant, etc. The computer 14 includes a processor 16 accessing one or more tangible non-transitory computer media 18 such as solid state storage and/or disk-based storage to undertake logic in accordance with present principles. The processor outputs visual images on a display 20 and receives user input from one or more input devices 22 such as keypads, keyboards, point-and-click devices, etc. The computer 14 can communicate using a network interface 24 such as a wired or wireless modem with the Internet and specifically with one or more clothing provider servers 26 having a respective server processor 28 accessing a server storage medium 30 on which is stored clothing article images and logic in accordance with present principles.

With the above example system in mind, attention is directed to FIG. 2. It is to be understood that the image normalizing and image superimposition discussed below may be executed by the user computer processor 16, the server processor 28, or a combination thereof, and the image normalization may be done on the fly if desired or upon image capture.

At block 32, the shopper image is received from the camera 12 by the user computer 14. The image may be downloaded over a universal serial bus (USB) link between the camera 12 and computer 14 or by other means, e.g., wireless means.

Regardless of how received, the shopper image is normalized at block 34. The user computer 14 may perform the normalization or the shopper image may be uploaded to the server 26 by means of an image web page provided by the server 26 to the user computer 14.

Normalization may be undertaken in a variety of ways. By way of non-limiting example, the shopper may be instructed to stand in front of a background size substrate that may be imprinted with x- and y-axis metric lines scored in, for instance, millimeters, similar to a police booking photograph. The normalizing processor may, through image recognition, apply the absolute dimensions shown on the substrate to the 3D shopper image, recording the absolute size of various elements of the shopper image, e.g., overall height and shopper breadth at the shoulders, chest, waist, and hips. Using computer aided design principles known in the art, the absolute size indicated by the metric lines may be propagated proportionally to other elements of the shopper image in other dimensions. In this way, the absolute size of the shopper shown in the image is known and, hence, the image is normalized to a standard, in this case, to absolute linear measurements.

In another implementation, a web page may be downloaded to the user computer 14 to allow the user to manually input absolute size measurements such as those mentioned above. These measurements are then used to normalize the shopper image. Yet again, the shopper can be prompted to input his/her physical dimensions such as height, bust size, the length of the desired dress/pants (or a range for length), etc., essentially the physical dimensions that would considered to be helpful in sizing a particular selected article, in addition to the 3D image of the shopper.

Yet again, the shopper may be instructed to generate her image using particular camera settings with the camera at a predetermined distance from the shopper. By instructing all shoppers to use the same camera distance and settings, the shopper images are normalized to the camera parameters, which produce images of known absolute sizes.

Still again, a shopper image may be normalized to a known article of clothing. As but two examples, if a male shopper seeks only to purchase dress shows and knows that a size 9D from Manufacturer A fits, the shopper can input this information. Or, a female shopper who knows that a size 6 dress from Designer B fits can input this information. As discussed further below, clothing article sizes are also normalized, so once the logic knows that a particular article fits the shopper image (or relevant portion thereof), the shopper image can be normalized to conform to a size for which the shopper-designated article fits.

Block 36 of FIG. 2 indicates that images of clothing articles are received, typically by the server 26, and normalized to a standard at block 38. The images may be 3D images of clothing articles. The normalization may be undertaken by receiving linear dimensions of the clothing from the manufacturer or by measuring dimensions of the clothing and then applying those measurements to the clothing images to normalize the sizes thereof. For instance, the toe, instep, and heel widths of a size 9D show from Manufacturer A may be measured/received and recorded and likewise the same dimensions for the same size from Manufacturer B. Each available size may be normalized if desired. In any case the images of the clothing articles are normalized using the actual clothing sizes to the same (in this case, linear millimeter) standard. Using the analogy above, if a size 8D shoe from Manufacturer A has the same millimeter dimensions in length/width as a size 9D shoe from Manufacturer B, the images of the two shoes are normalized to appear to be the same size when overlaid onto the shopper image.

Likewise, the normalized image of a size 6 dress from Designer A that has, as an example, the same bust, waist, and hip dimensions in millimeters (or other scale) as a size 7 dress from Designer B appears to be the same size as the image of the size 7 dress from Designer B when overlaid on the shopper image.

Yet again, as mentioned above instead of using an absolute linear standard for normalization, a reference size from a particular manufacturer may be designated as the standard and then other articles from other manufacturers normalized to that standard in proportion to how the articles actually differ in size from the standard.

It is to be understood that while shopper and clothing images are normalized to a standard, they may be shrunk in size for presentation by a predetermined scale, e.g., by a 10:1 scale.

Moving to block 40, a clothing selection page or pages; are downloaded to the user computer 14 when, for example, the shopper accesses the website of the server 26. During this process, necessary shopper images/clothing images are transferred between the computer 14 and server 26 as needed to execute the logic. Using the web page, the shopper can click on a desired clothing article, which selection is received at block 42. The normalized shopper image is then matched at block 44 with the size of the article that fits the normalized shopper image, and the normalized image of the selected article in the correct size is superimposed upon the normalized shopper image at block 46 to form a composite image that is presented on the display 20.

Also, along with the composite image a message may be presented on the display indicating the correct size of the selected article from the selected manufacturer/designer which corresponds to the normalized size. For example, if the correct size of a selected dress from Designer A is 7 for the normalized shopper image, a message can be presented on the display 20 stating that "size 7 for this article fits you, and here is what it looks like when you put it on", or words to that effect.

FIGS. 3 and 4 show that a normalized 3D shopper image 48 may be presented on the display 20 along with multiple hairpieces 50, 52 available from the server 26. Should a shopper select the hairpiece 50 as indicated in FIG. 3, the image of the hairpiece is superimposed on the shopper image 48 as shown in FIG. 4 to indicate to the shopper what the selected hairpiece would look like when worn by the shopper.

While the particular ONLINE CLOTHING SHOPPING USING 3D IMAGE OF SHOPPER is herein shown and described in detail, it is to be understood that the subject matter which is encompassed by the present invention is limited only by the claims.

What is claimed is:

1. A method for normalizing images of purchasable articles of clothing, the method comprising:
  receiving at a computer processor an image of a shopper, wherein the image of the shopper includes the shopper positioned in front of a background size substrate having vertical and horizontal measurement lines;
  normalizing the image of the shopper to a standard clothing size using the computer processor, wherein the normalization of the image of the shopper is based on a determination of one or more absolute sizes of the shopper in the image using the vertical and horizontal measurement lines;

receiving an image of a clothing article from a clothing provider server;

normalizing the image of the clothing article to the standard clothing size using the computer processor, wherein the normalization of the image of the clothing article is based on a determination using linear dimensions of the clothing article received from a manufacturer;

generating a composite image superimposing the normalized image of the clothing article with the normalized image of the shopper.

2. The method of claim 1, wherein the image of the shopper is a 3D image.

3. The method of claim 1, wherein the act of generating the composite image is responsive to receiving a selection from the shopper of a clothing article.

4. The method of claim 1, comprising, responsive to receiving the selection, determining a correct size of the clothing article based on the normalized shopper image.

5. The method of claim 1, wherein the normalizing of the image of the shopper is further based at least in part on comparing a respective size of the clothing article to a standard clothing article size.

6. The method of claim 1, comprising presenting a correct size on a display in terms of a clothing article source-defined size.

7. A system for normalizing images of purchasable articles of clothing, the system comprising:

at least one computer processor;

at least one memory configured to cause the at least one processor to:

receive at the at least one computer processor an image of a shopper, wherein the image of the shopper includes the shopper positioned in front of a background size substrate having vertical and horizontal measurement lines;

normalize the image of the shopper to a standard clothing size using the at least one computer processor, wherein the normalization of the image of the shopper is based on a determination of one or more absolute sizes of the shopper in the image using the vertical and horizontal measurement lines;

receive an image of a clothing article from a clothing provider server;

normalize the image of the clothing article to the standard clothing size using the at least one computer processor, wherein the normalization of the image of the clothing article is based on a determination using linear dimensions of the clothing article received from a manufacturer;

generate a composite image superimposing the normalized image of the clothing article with the normalized image of the shopper.

8. The system of claim 7, wherein the image of the shopper is a 3D image.

9. The system of claim 7, wherein the composite image is generated responsive to receiving a selection from the shopper of the clothing article.

10. The system of claim 7, wherein the processor, responsive to receiving the selection, determines a correct size of the clothing article based on the normalized shopper image.

11. The system of claim 7, wherein the normalization of the image of the shopper is further based at least in part on comparing a respective size of the clothing article to a standard clothing article size.

12. The system of claim 7, wherein the processor presents a correct size on a display in terms of a clothing article source-defined size.

* * * * *